United States Patent
Kalbag

(10) Patent No.: US 10,378,221 B2
(45) Date of Patent: Aug. 13, 2019

(54) DRYWALL MUD APPLICATOR WHEELLESS CONTROL TUBE

(71) Applicant: Anirudh Kalbag, Westchester, IL (US)

(72) Inventor: Anirudh Kalbag, Westchester, IL (US)

(73) Assignee: DRYWALL MASTER TOOLS, INC., Westchester, IL (US)

( * ) Notice: Subject to any disclaimer, the term of this patent is extended or adjusted under 35 U.S.C. 154(b) by 0 days.

(21) Appl. No.: 16/027,595

(22) Filed: Jul. 5, 2018

(65) Prior Publication Data

US 2019/0010712 A1 Jan. 10, 2019

Related U.S. Application Data

(60) Provisional application No. 62/529,502, filed on Jul. 7, 2017.

(51) Int. Cl.
| | | |
|---|---|---|
| *B32B 38/00* | (2006.01) | |
| *E04F 21/08* | (2006.01) | |
| *E04F 21/02* | (2006.01) | |
| *E04F 21/165* | (2006.01) | |
| *B32B 37/00* | (2006.01) | |

(52) U.S. Cl.
CPC ............ *E04F 21/08* (2013.01); *E04F 21/026* (2013.01); *E04F 21/165* (2013.01); *B32B 37/00* (2013.01); *B32B 38/00* (2013.01)

(58) Field of Classification Search
CPC ........ B32B 37/00; B32B 38/00; E04F 21/026; E04F 21/08; E04F 21/165

USPC ................................................. 156/574, 575
See application file for complete search history.

(56) References Cited

U.S. PATENT DOCUMENTS

| | | | | |
|---|---|---|---|---|
| 6,481,764 | B1 * | 11/2002 | Kwok .................... | B21D 39/04 285/382 |
| 7,621,309 | B1 * | 11/2009 | Mondloch ................ | B44C 7/06 156/526 |
| 2004/0107585 | A1 * | 6/2004 | Helmrich ................ | B26B 19/38 30/537 |
| 2006/0282048 | A1 * | 12/2006 | Kimura .............. | A61B 17/3478 604/272 |
| 2007/0215289 | A1 * | 9/2007 | Kennedy ............... | E04F 21/165 156/577 |
| 2010/0071852 | A1 * | 3/2010 | Jungklaus .......... | B65H 35/0053 156/526 |
| 2012/0228025 | A1 * | 9/2012 | Nieto Lopez ............ | H02G 1/00 174/74 A |
| 2016/0279919 | A1 * | 9/2016 | Jungklaus .............. | E04F 21/026 |

* cited by examiner

*Primary Examiner* — Mark A Osele
*Assistant Examiner* — Nickolas R Harm
(74) *Attorney, Agent, or Firm* — Justin Lampel

(57) ABSTRACT

A drywall mud applicator wheelless control tube is provided. The drywall mud applicator wheelless control tube has a plastic component (in an embodiment) having a rubber o-ring or spring which provides pressure to a slanted cylindrical ledge protrusion which allows the control tube to slide up and down a main mud applicator tube without the need for wheels on the control tube. As a result, the wheelless control tube increases the sliding and smoothness of the control tube as it slides over the main mud applicator tube.

9 Claims, 5 Drawing Sheets

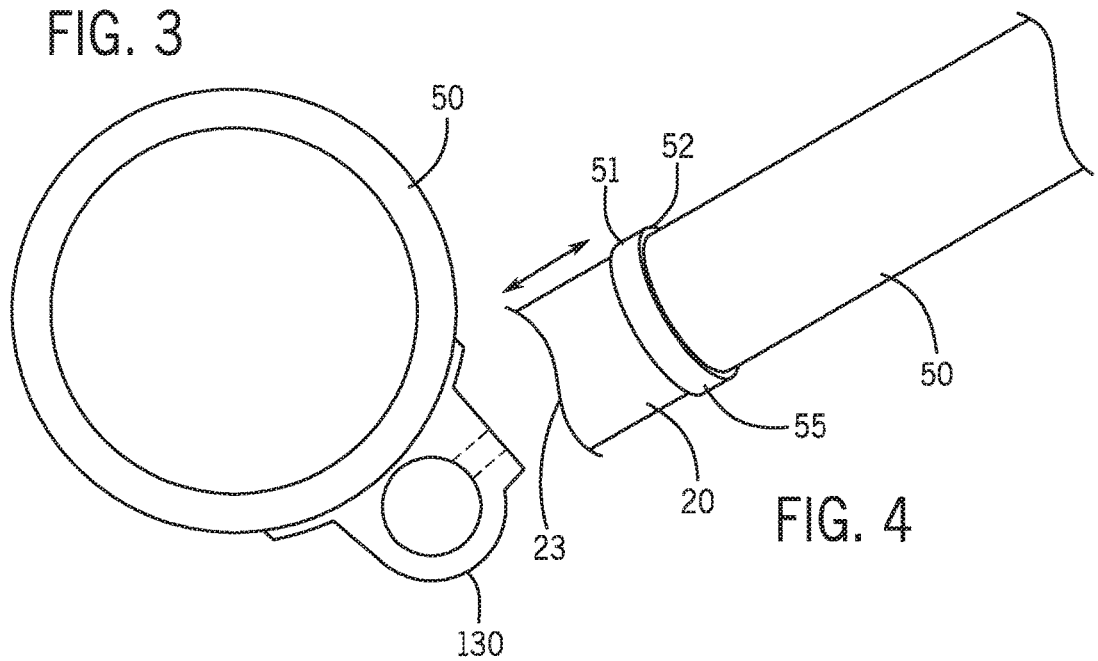
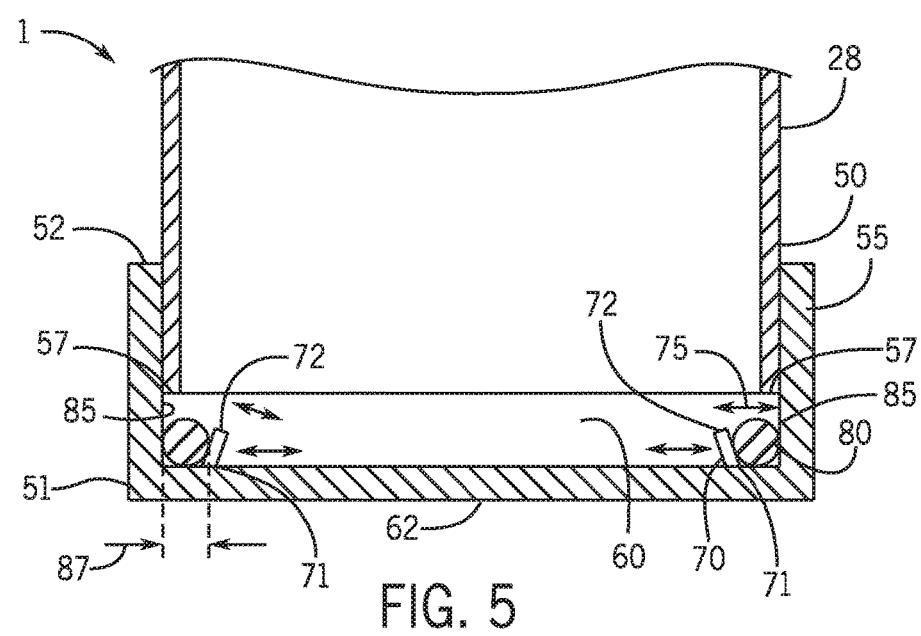

DRYWALL MUD APPLICATOR WHEELLESS CONTROL TUBE

CROSS REFERENCE TO RELATED APPLICATIONS

The following application is a based on and claims the priority benefit of U.S. provisional application Ser. No. 62/529,502 filed Jul. 7, 2017; the entire content of which is incorporated by reference.

BACKGROUND OF THE INVENTION

A drywall mud applicator wheelless control tube is provided. The drywall mud applicator wheelless control tube has a plastic component (in an embodiment) having a rubber o-ring or spring which provides pressure to a slanted cylindrical ledge protrusion which allows the control tube to slide up and down a main mud applicator tube without the need for wheels on the control tube. As a result, the wheelless control tube increases the sliding and smoothness of the control tube as it slides over the main mud applicator tube.

Drywall mud applicators having interior components have been invented in the past. For example, U.S. Pat. No. 5,902,451 to O'Mara discloses an applicator for applying joint compound or mud to wallboard having six embodiments with a head, a mud outlet and a mud hose. The applicator has a handle and a control valve for controlling the flow of mud. Each embodiment also has a screed on the head above the mud outlet which extends beyond the end of the head. The screed smoothes down the mud applied to the wall and wipes away any excess mud. The first embodiment has a fan-shaped head with baffles to define multiple flow ports. The second and third embodiments have a rectangular head and a pair of retractable corner stops which align the mud outlets flush with the corners of drywall sections. The third embodiment adds a dispersion mechanism for varying the width of the outlet. The fourth embodiment of the applicator has a wedge-shaped head and a V-shaped screed with flow ports in the sidewalls that are designed to apply mud to right-angled corners. The control valve of the final embodiment has a cylindrical core with a slot which selectively aligns with a slot in the mud chamber. The control valve is operated by a spring-biased lever which contacts the wall. The lever has a pair of arms and a wheel on each arm. The arms extend from an outer edge of the control valve past the mud outlet to automatically open flow when the head is pressed against the wall.

Further, U.S. Pat. No. 5,545,287 to Carlson discloses a tool for finishing joints at flat surfaces or corners of wallboard walls after adhesive and tape have been applied are attached to the applicator tool by a rotatable yoke connection near the roller of the applicator so that the finishing tool will follow the applicator tool. The finishing tool includes a roller rotatable about an axle for embedding tape into the adhesive. Frame structure rotatably supported on the roller axle is provided with trowel means having a working surface moving parallel to the wallboard surface and placed close to the roller, at least on the sides, to spread adhesive pressed from under the tape back over the tape. Finishing means attached to the frame structure to follow the trowel collects the excess adhesive and distributes it in a smooth surface generally in the plane of the wallboard, filling in any voids left by trowel action. A cylindrical roller is used for joints in flat wallboard. A finishing tool having a complex roller having a base-to-base dual right frustoconcial form with an axle on the common axes of the cones and conical surfaces meeting at an angle of no more than 90.degree is used in the corner.

However, these drywall mud applicators do not provide a drywall mud applicator having a wheeless control tube which is easy to use, efficient and inexpensive as is disclosed in the present application.

SUMMARY OF THE INVENTION

A drywall mud applicator wheelless control tube is provided. The drywall mud applicator wheelless control tube has a plastic component (in an embodiment) having a rubber o-ring or spring which provides pressure to a slanted cylindrical ledge protrusion which allows the control tube to slide up and down a main mud applicator tube without the need for wheels on the control tube. As a result, the wheelless control tube increases the sliding and smoothness of the control tube as it slides over the main mud applicator tube.

An advantage of the present drywall applicator wheelless control tube is that the present device provides smoother sliding of a control tube over a main mud applicator tube.

Another advantage of the present drywall wheelless control tube is that the present device eliminates or reduces the maintenance and repair time needed to repair or replace existing control tubes having wheels.

Yet another advantage of the present drywall wheelless control tube is that the present device may reduce manufacturing time of the drywall mud applicator.

Still another advantage of the present drywall wheelless control tube is that the present device may reduce or eliminate problems associated with mud getting caught within the wheels of traditional mud applicators.

For a more complete understanding of the above listed features and advantages of the present drywall mud applicator wheelless control tube reference should be made to the following detailed description of the preferred embodiments. Further, additional features and advantages of the invention are described in, and will be apparent from, the detailed description of the preferred embodiments.

BRIEF DESCRIPTION OF THE DRAWINGS

FIG. 3 illustrates a top/bottom view of the wheelless control tube of the present device.

FIG. 4 illustrates a side perspective view of a portion of the wheelless control tube of the present device.

FIG. 5 illustrates a cross-sectional side view of the cap portion of the wheelless control tube of the present device.

DETAILED DESCRIPTION OF THE PREFERRED EMBODIMENTS

A drywall mud applicator wheelless control tube is provided. The drywall mud applicator wheelless control tube has a plastic component (in an embodiment) having a rubber o-ring or spring which provides pressure to a slanted cylindrical ledge protrusion which allows the control tube to slide up and down a main mud applicator tube without the need for wheels on the control tube. As a result, the wheelless control tube increases the sliding and smoothness of the control tube as it slides over the main mud applicator tube.

Figure 1:
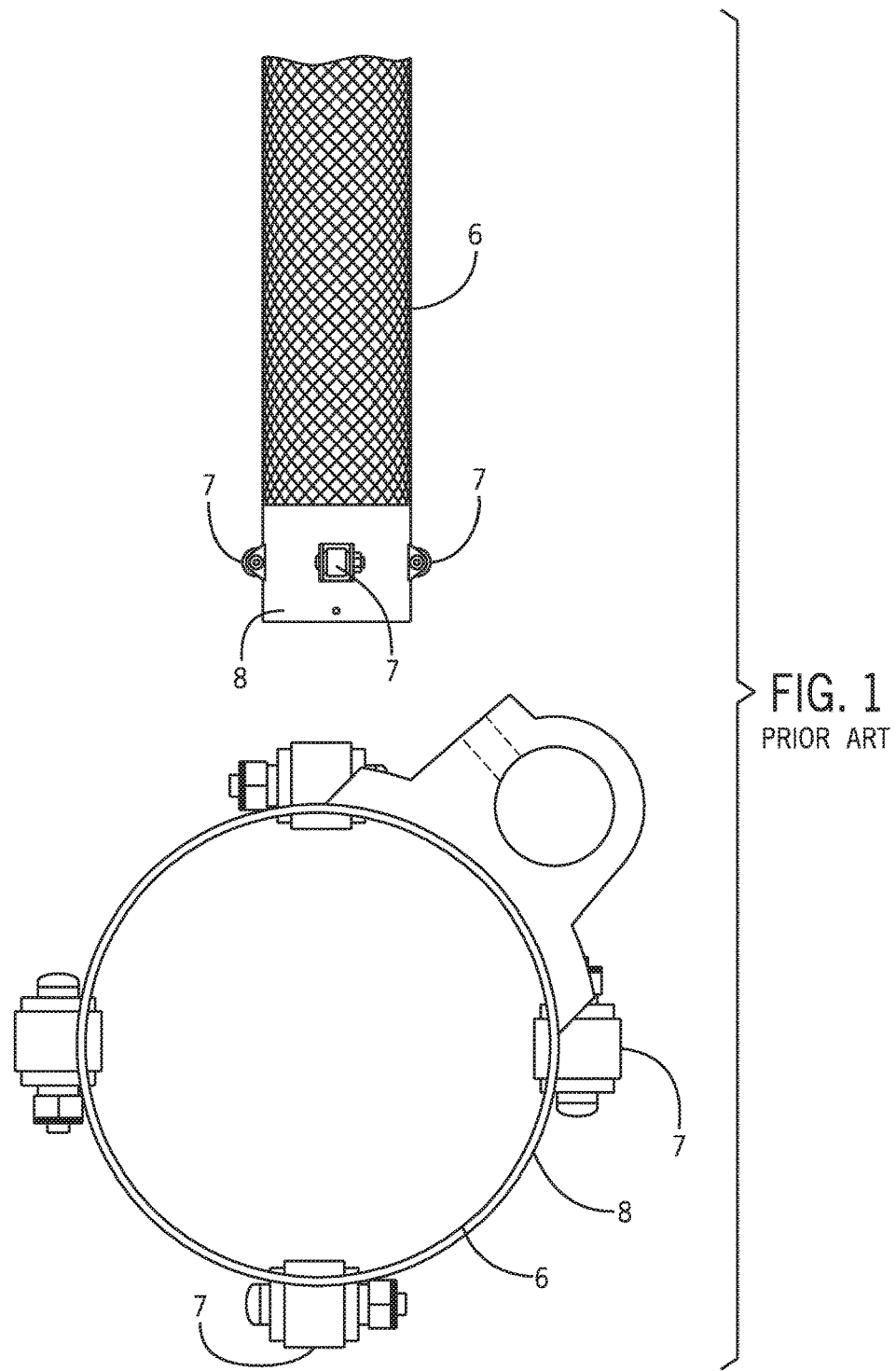
FIG. 1 illustrates a front and top view of the prior art control tube of a drywall mud applicator wherein wheels are used to move the control tube up and down the main mud applicator tube.
Figure 2:
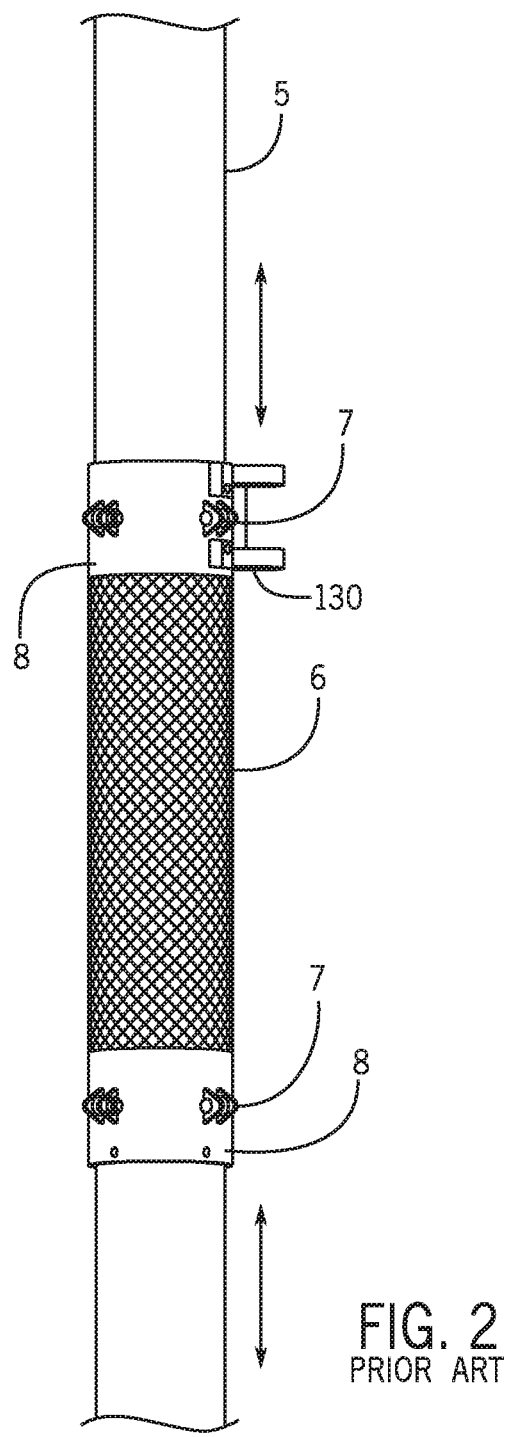
FIG. 2 illustrates a side perspective view of the prior art control tube of a drywall mud applicator wherein wheels are used to move the control tube up and down the main mud applicator tube.

Referring first to the prior art of FIGS. 1 and 2, prior art mud applicators generally have a taper tube 5 and a prior art control tube 6 wherein the prior art control tube 6 has a plurality of wheels 7 located on a cap portion 8 which allows the prior art control tube 6 to move up and down with respect to the taper tube 5.

Referring now to FIGS. 3-5, in an embodiment of the present device, a drywall mud applicator 1 is provided. The drywall mud applicator 1 may have a main mud applicator tube 20 (or "taper tube") and a movable wheelless control tube 50 wherein the movable control tube 50 moves up and down the main mud applicator tube 20. In an embodiment, the movable wheelless control tube 50 has an attached control bar (not shown) which attaches to a securing device 130 located on the movable wheelless control tube 50. The securing device 130 and the control bar allow an operator to control the position of the movable wheelless control tube 50 with respect to the main mud applicator tube 20 and thus, control the operation of the taper device.

Figure 8:
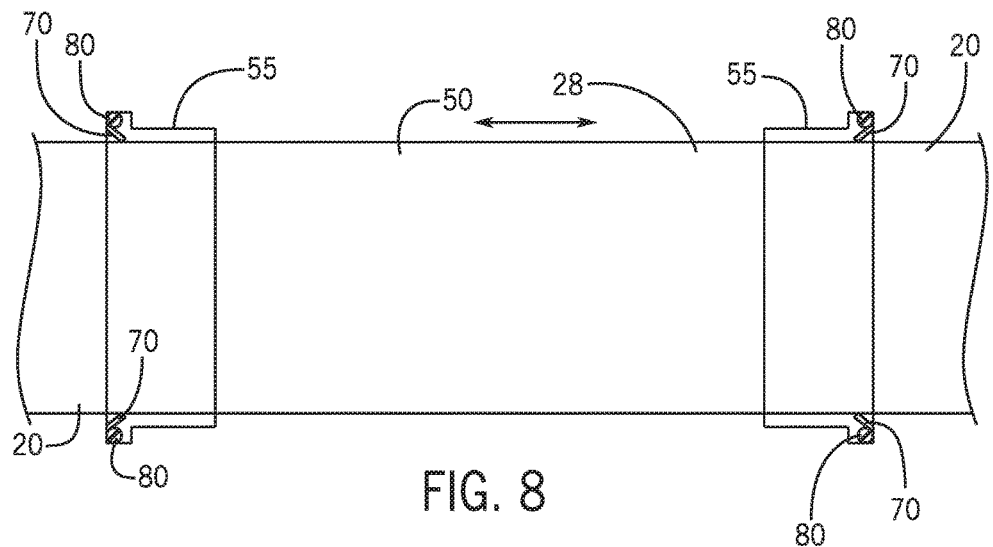
FIG. 8 illustrates a side cross-sectional side view of the entire wheelless control tube located on the main mud applicator tube of the present device.

The movable wheelless control tube 50 may have a generally cylindrical portion 28 (FIG. 5) separated by two cap portions 55 (FIG. 5). In an embodiment, one cap portion 55 is located at the first end 57 of the generally cylindrical portion 28 of the movable control tube 50 and a second cap portion 55 is located at a second end (not shown in FIG. 5) of the generally cylindrical portion 28 of the movable wheelless control tube 50. In an embodiment, the caps 55 of the movable wheelless control tube 50 may be generally symmetrical (aside from the securing device 130) and in a mirror image orientation with respect to each other as is shown in FIG. 8.

Figure 6:
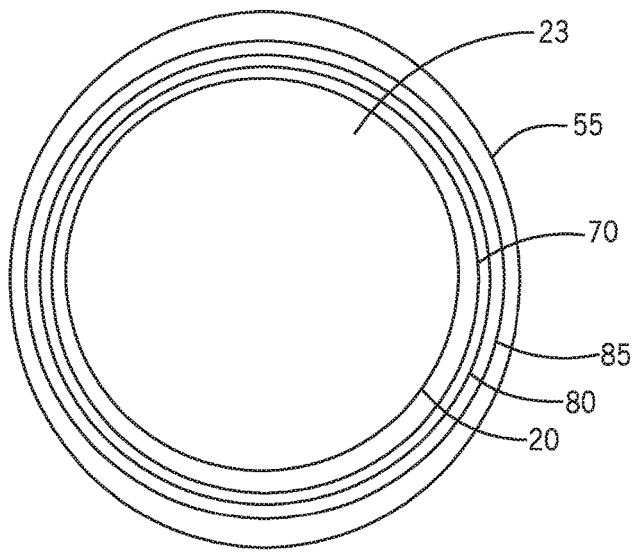
FIG. 6 illustrates a top/bottom cross-sectional view of the cap portion of the wheelless control tube and main mud applicator tube of the present device.

The main mud applicator tube 20 may have a first end, a second end, and a generally hollow interior 23 (FIG. 6) wherein mud (not shown) moves through the generally hollow interior 23 of the main mud applicator tube 20 during the process of adding mud to a wall. In an embodiment, the first end (not shown) of the main mud applicator tube 20 may be the business end of the device 1. More specifically, the first end may be the portion of the device 1 that the mud exits the device 1 and is placed on the wall.

In an embodiment, the cap portion 55 of the generally cylindrical tube 28 of the movable wheelless control tube 50 may have a first end 51 (FIG. 5) and a second end 52 wherein the first end 51 of the cap portion 55 extends beyond the generally cylindrical tube 28 while the second end 52 of the cap portion 55 is secured to the generally cylindrical tube 28 of the movable wheelless control tube 50. In an embodiment, during assembly of the device, the cap portion 55 may slide over the ends 57 of the generally cylindrical portion 28 of the movable wheelless control tube 50 and may be secured to the generally cylindrical portion 28 of the movable wheelless control tube 50 by, for example, a threaded member mating system (not shown). As a result, the cap portion 55 may be removed from the generally cylindrical portion 28 of the movable wheelless control tube 50 in an embodiment so as to allow the user to clean, repair and/or replace the elements of the movable wheelless control tube 50.

Figure 7B:
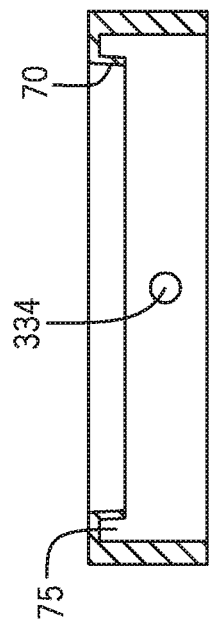
FIG. 7B illustrates a cross section of the cap portion of the wheelless control tube wherein the slanted ledge is shown without the o-ring or spring.

Located within an interior 60 of the cap portion 55 of the movable wheelless control tube 50 may be a slanted cylindrical ledge protrusion 70 which may slant inward, toward a center of the cap portion 55. The slanted cylindrical ledge protrusion 70 may have a first end 71 and a second end 72 wherein the first end 71 is secured to a portion of the cap 55 and wherein the second end 72 is free. The slanted cylindrical ledge protrusion 70 may therein be a ring which runs along the interior circumference of the cap 55 and which bends slightly at the second end 72 while the first end 71 remains in a constant location with respect to the cap 55. As discussed below, the slanted cylindrical ledge protrusion 70 may initially start out parallel to the cap portion 55 (as shown in FIG. 7B) prior to the introduction of an o-ring or spring 80 as described below.

In an embodiment, a space 75 (or "o-ring slot") may thus be created between the slanted cylindrical ledge protrusion 70 and an interior side wall 85 of the cap portion 55. Located within the space 75 of the cap 55, may be a circular o-ring or spring 80. In embodiment, the o-ring 80 is made of rubber and thus may provide elastic resistance. The o-ring 80 (or spring) may have a diameter 87 which is at least slightly larger than a natural width portion of the space 75 between the slanted cylindrical ledge protrusion 70 and the interior side wall 85 of the cap 55. As a result, the o-ring or spring 80 exerts a pressure against within the space 75 slightly forcing the second end 72 of the slanted cylindrical ledge protrusion 70 toward the center of the cap portion 55. In an embodiment, the cap portion 55 may have an opening 62 which may receive the main mud tube 20.

As a result of the slanted cylindrical ledge protrusion 70 being forced inward (at the second end 72), the second end 72 of the slanted cylindrical ledge protrusion 70 directly contacts the main mud tube 20. It is important that the slanted cylindrical ledge protrusion 70 contact the main mud tube 20 with pressure and evenly around the main mud tube 20 to allow the movable wheelless control tube 50 to properly operate. Whereas in prior art devices (see FIGS. 1 and 2) wheels 7 would allow the movable control tube 6 to slide up and down the main mud tube 5, in the present device, the slanted cylindrical ledge protrusion 70 provides the same function as the wheels 7. More specifically, the slanted cylindrical ledge protrusion 70 may be a circular ledge running along the entire circumference of the cap portion 55 wherein the slanted cylindrical ledge protrusion 70 directly contacts the main mud applicator tube 20 and completely touches the main mud applicator tube 20 at a cross section.

Referring now to FIG. 8, in an embodiment, the slanted cylindrical ledge portions 70 of both caps portions 55 may be angled inward, toward the center of the control tube 50, which may completely surround the main mud tube 20 at a cross section. In an embodiment, the two slanted cylindrical ledge portions 70 (one at both ends of the caps portions 55) may support the movable wheelless control tube 50 onto the main mud tube 20. More specifically, in an embodiment, the only point of contact between the movable wheelless control tube 50 and the main mud tube 20 may be the two slanted cylindrical ledge portions 70 of the movable wheelless control tube 20.

Figure 7A:
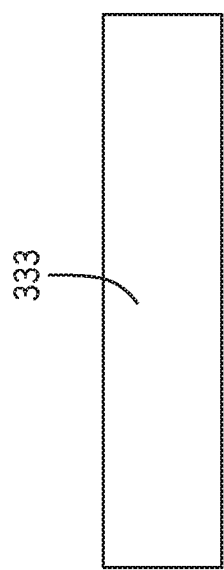
FIG. 7A illustrates the exterior surface of the cap portion of the wheelless control tube.
Figure 7C:
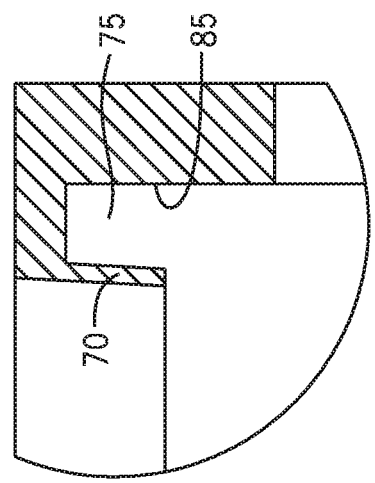
FIG. 7C illustrates a close up of FIG. 7B.

Finally, FIGS. 7A-7C, illustrate the cap portion 55 of the present movable wheelless control tune 50 in more detail. In an embodiment, the slanted cylindrical ledge portion 70 may be generally parallel to the interior side wall 85 of the cap 55 prior to the introduction of the o-ring or spring 80. Thus the o-ring or spring 80 provides pressure to force the slanted cylindrical ledge portion 70 inward, toward the center of the cap 55. In an embodiment, an opening 334 on the exterior 333 of the cap 55 may receive a securing device (not shown) to secure the cap 55 to the movable wheelless control tube 50.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A drywall mud applicator comprising:
   a first end and a second end of a first main hollow tube wherein the first main hollow tube has a diameter;
   a second tube having a greater diameter than the first main hollow tube wherein the second tube has a first end and a second end and wherein the second tube is capable of sliding over the first main hollow tube and moving back and forth over the first main hollow tube;
   wherein the second tube has a length which is less than a length of the first main hollow tube;
   wherein the second tube has a first generally cylindrical ring located on the first end and a second generally cylindrical ring located on the second end;
   wherein a liquid travels through the first main hollow tube and exits the first main hollow tube;
   wherein the first generally cylindrical ring and the second generally cylindrical ring of the second tube are generally flat; and
   wherein the first generally cylindrical ring and the second generally cylindrical ring of the second tube are slanted inward toward a center of the second tube.

2. The drywall mud applicator of claim 1 wherein the first generally cylindrical ring and the second generally cylindrical ring are in mirror orientation with respect to each other.

3. The drywall mud applicator of claim 1 wherein the first generally cylindrical ring and the second generally cylindrical ring are the only points of contact between the first main hollow tube and the second tube.

4. The drywall mud applicator of claim 1 wherein the first generally cylindrical ring and the second generally cylindrical ring of the second tube are flat.

5. A drywall mud applicator comprising:
   a first end and a second end of a first main hollow tube wherein the first main hollow tube has a diameter;
   a second tube having a greater diameter than the first main hollow tube wherein the second tube has a first end and a second end and wherein the second tube is capable of sliding over the first main hollow tube and moving back and forth over the first main hollow tube;
   wherein the second tube has a length which is less than a length of the first main hollow tube;
   wherein the second tube has a first generally cylindrical ring located on the first end and a second generally cylindrical ring located on the second end;
   wherein a liquid travels through the first main hollow tube and exits the first main hollow tube; and
   a first o-ring located between the first generally cylindrical ring and an interior wall of the second tube and a second o-ring located between the second generally cylindrical ring and the interior wall of the second tube.

6. The drywall mud applicator of claim 5 wherein the first o-ring exerts pressure on the first generally cylindrical ring and pushes the first generally cylindrical ring toward a center of the second tube.

7. The drywall mud applicator of claim 5 wherein the first and/or second o-ring is made of rubber.

8. A drywall mud applicator comprising:
   a first end and a second end of a first main hollow tube wherein the first main hollow tube has a diameter;
   a second tube having a greater diameter than the first main hollow tube wherein the second tube has a first end and a second end and wherein the second tube is capable of sliding over the first main hollow tube and moving back and forth over the first main hollow tube;
   wherein the second tube has a length which is less than a length of the first main hollow tube;
   wherein the second tube has a first generally cylindrical ring located on the first end and a second generally cylindrical ring located on the second end;
   wherein a liquid travels through the first main hollow tube and exits the first main hollow tube;
   a first spring located between the first generally cylindrical ring and an interior wall of the second tube and a second spring located between the second generally cylindrical ring and the interior wall of the second tube.

9. The drywall mud applicator of claim 8 wherein the first spring exerts pressure on the first generally cylindrical ring and pushes the first generally cylindrical ring toward a center of the second tube.

* * * * *